UNITED STATES PATENT OFFICE.

EDUARD ECK, OF GROSS ANHEIM, AND ERNST BECHTEL, OF HANAU, GERMANY, ASSIGNORS TO HANAUER KUNSTSEIDEFABRIK, OF HANAU, GERMANY, A CORPORATION OF GERMANY.

SOLUTION OF CELLULOSE.

No. 840,611.   Specification of Letters Patent.   Patented Jan. 8, 1907.

Application filed June 7, 1906. Serial No. 320,644.

*To all whom it may concern:*

Be it known that we, EDUARD ECK, of Gross Anheim, and ERNST BECHTEL, of Hanau, Germany, subjects of the German Emperor, have invented certain new and useful Improvements in Solutions of Cellulose, of which the following is a specification.

Our invention relates to the manufacture of a solution of cellulose with ammoniureted cupric oxid which is fit for the manufacture of cellulose products of every description. Hitherto such a solution has been manufactured in the manner that cotton or similar cellulose was treated with a previously-prepared solution of ammoniureted cupric oxid. This process, however, required an excessively long time. Attempts have been made to accelerate the process by preparing the cellulose to be dissolved with agents—for example, a solution of caustic soda; but this process still required eight or ten hours, which of course is too long for a commercial manufacture on a great scale.

Our invention consists in a process of producing the said cellulose solution within a few minutes. This process is characterized in that the solution of ammoniureted cupric oxid is caused to act not in its ready state, but in its nascent state, upon the cellulose.

Our new process is as follows: First, the cellulose is impregnated in an aqueous solution of ammonia, then a paste of cupric oxid is added, and the whole is properly shaken or agitated. The cellulose will readily dissolve, and after a few minutes the solution will be completely ready for use.

The process may also be modified in that the solution of ammonia and the paste of cupric oxid are first mixed, and then before any reaction takes place between them the cellulose is added.

The new process also presents the advantage that the solution of ammoniureted cupric oxid, acting in its nascent state upon the cellulose, will dissolve more cellulose than hitherto. By the known methods it was only possible to produce a solution of eight per cent. at the most of cellulose, whereas the new process renders it easy to obtain solutions of ten per cent. and more of cellulose. Of course such a more concentrated solution will prove more advantageous for the manufacture of the cellulose products.

We claim—

The process of manufacturing a solution of cellulose with ammoniureted cupric oxid, which consists in impregnating cellulose in an aqueous solution of ammonia, adding a paste of cupric oxid, and shaking or agitating the whole.

In testimony whereof we have signed our names to this specification in the presence of two subscribing witnesses.

EDUARD ECK.
ERNST BECHTEL.

Witnesses:
FRANZ HASSLASHER,
ERWIN DIPPEL.